(12) United States Patent  
Gomez (10) Patent No.: US 9,089,725 B2
(45) Date of Patent: Jul. 28, 2015

(54) METHOD AND DEVICES FOR MANMADE PRECIPITATIONS

(76) Inventor: Julio Gomez, Brisbane (AU)

( * ) Notice: Subject to any disclaimer, the term of this patent is extended or adjusted under 35 U.S.C. 154(b) by 198 days.

(21) Appl. No.: 13/515,773

(22) PCT Filed: Jan. 20, 2011

(86) PCT No.: PCT/AU2011/000061
§ 371 (c)(1),
(2), (4) Date: Jun. 13, 2012

(87) PCT Pub. No.: WO2011/091468
PCT Pub. Date: Aug. 4, 2011

(65) Prior Publication Data
US 2012/0280054 A1 Nov. 8, 2012

(30) Foreign Application Priority Data
Jan. 27, 2010 (AU) ................................ 2010900324

(51) Int. Cl.
B64D 1/18 (2006.01)
A62C 3/02 (2006.01)
B64D 1/16 (2006.01)

(52) U.S. Cl.
CPC ................ *A62C 3/0235* (2013.01); *B64D 1/16* (2013.01)

(58) Field of Classification Search
CPC .. A62C 3/0242; A62C 3/0228; A62C 3/0235; A62C 35/02; A62C 3/025; A62C 8/005; A62C 13/78; A62C 35/08; A62C 3/08; A62C 5/033; A62C 3/07; A62C 35/68; A62C 3/00; A62C 3/02; A62C 31/00; A62C 8/02; A01C 23/006; A01C 7/085
USPC ....... 137/255; 239/171; 244/136; 169/53–62; 220/203.2, 203.1, 203.22, 203.19, 220/4.12, 563, 1.6
See application file for complete search history.

(56) References Cited

U.S. PATENT DOCUMENTS

| | | | |
|---|---|---|---|
| 3,485,302 A * | 12/1969 | Thorpe | 169/53 |
| 3,698,480 A | 10/1972 | Newton | |
| 5,135,055 A | 8/1992 | Bisson | |
| 6,994,274 B2 * | 2/2006 | Thompson et al. | 239/146 |
| 7,284,727 B2 | 10/2007 | Nolan | |
| 2003/0230585 A1 * | 12/2003 | Hagenbuch | 220/563 |

FOREIGN PATENT DOCUMENTS

WO WO 2011/091468 A1 8/2011

* cited by examiner

Primary Examiner — Len Tran
Assistant Examiner — Adam J Rogers
(74) Attorney, Agent, or Firm — Jill A. Jacobson (57) ABSTRACT

Devices are provided that allow helicopters and Transport Aircrafts to carry or lift liquid compounds to fumigate, spray or a single massive drop for purposes such as irrigation, fumigation, chemical treatment and fire control with no modification to the aircrafts and no power or direct electromechanical assistance from the aircraft, thus preserving the original integrity and applications of the aircraft.

7 Claims, 12 Drawing Sheets

METHOD AND DEVICES FOR MANMADE PRECIPITATIONS

CROSS-REFERENCE TO RELATED APPLICATIONS

This application is a U.S. national stage application under 35 U.S.C. §371 of PCT/AU2011/000061, filed on Jan. 20, 2011 and published as WO2011/091468 on Aug. 4, 2011, which claims priority to Australian application no. 2010900324, filed on Jan. 27, 2010.

FIELD OF INVENTION

The present invention relates to the means that allows helicopters and Transport Aircrafts with rear or tail gate to carry or lift liquid compounds to fumigate, spray or a single massive drop for the purposes such as irrigation, chemical treatment and fire control; with no modification to the aircrafts thus preserving the original integrity and application of the aircraft.

BACKGROUND OF THE INVENTION

The ability to control and fight fires in forests and areas close to residential areas is a major concern for fire fighters and fire fighting administrators. Ground fire fighting includes use of water hoses while aerial fire fighting includes fire-bombing. In its crudest form, fire-bombing involves dropping large quantities of water as quickly as possible on the fire from an aircraft. While releasing liquids including water from an aircraft is a well know practice, the fire fighting aircraft availability at the moment, with the exception of light helicopters, is restricted to refurbished old aircrafts containing vessels such as water tanks, and electro-mechanical means to load fast and some with water tanks, mechanical means and pressure vessels to blast the liquids out the containers such as tanks. Ancillary equipment and electro-mechanical means are heavy and require large amounts of fuel or energy, thereby reducing significantly the water lifting capacity. Modified choppers currently reach a maximum capacity of 6,000 liters and fixed wing transport aircraft up to 40,000 liters, and modified 747 super jets up to 70,000 liters.

The biggest Helicopter is the Russian Mil Mi-26 with a lifting capacity of 20,000 liters of water, the latest USA Chinook 15,000 liters of water, Australian Chinook 12,000 liters of water, the biggest transport aircraft, the Russian Antonov An-224, is capable of carrying 150,000 liters of water, the USA C-5B Galaxy 125,000 liters of water and the Australian C-17 Glovemaster 76,000 liters of water.

Governments spend millions in commercial aerial fire fighters which are second-hand airliners, superseded heavy lifting helicopters. The overwhelming concern is "commercial means are useless against catastrophic Fires due to their technological inferiority" and fires will rage uncontrolled again taking lives, burning homes, bush and decimating the fragile fauna; actually in the last 26 years Australian communities have been devastated 7 times.

The aircraft gravity centre is preserved by locating the load at the centre of the loading area which is the responsibility of the "Load Master", it is impossible to eject the water instantly, the water is ejected gradually allowing time to compensate the loss on weight.

Thus there is a need for efficient and convenient method of fire fighting.

It is an object of the invention to address some of the problems in the art and provide an efficient method of fire fighting.

SUMMARY OF THE INVENTION

The invention provides a device for holding liquids comprising linkable, connectable and lockable members.

Preferably, the device is a tank.

Preferably, the device is a tank comprising material suitable for aerial firefighting, chemical treatment, fumigation and irrigation.

Preferably, the device comprises a series of tanks.

Preferably, the tanks control the flow of liquid for downloading fire fighting material.

Preferably, the flow of liquid is controlled by electro mechanic devices.

Preferably, the flow is controlled by the opening and closing of the electro mechanic devices.

Preferably, the electro mechanic devices are partially open or closed.

Preferably, the device comprises a downloading member.

Preferably, the downloading member forms a stiffened front end.

In another aspect, the invention provides a method of transporting fluid in aircrafts comprising filling fluid in containers wherein the containers are linkable, connectable and lockable.

In another aspect, the invention provides a method of controlling fires using aircraft comprising filling water and fire retardant material in containers according to the device as defined herein and downloading or dropping the material onto the affected areas.

In another aspect, the invention provides a method of controlling weed comprising filling fumigating compounds in containers according to the device as described herein, and spraying the compounds onto a field.

In another aspect, the invention provides a method of treating an affected field comprising filling fumigating compounds in containers according to the device as herein and spraying the compounds onto a field.

Preferably, the downloading of fluids from an aircraft is controlled by conditions selected from a group comprising the direction of wind, wind velocity, the inertia produced by aircrafts as acceleration, and the gravity produced naturally as the aircraft lifts the front end the above combination virtually leaves the liquid behind without mechanical means.

Preferably, the aircraft is selected from transporter aircrafts with a rear gate selected from the group consisting of the Russian Mil Mi-26, the Russian Antonov An-224, the US C5B Galaxy, the US C17 Glovemaster III, the US C130 Hercules, the US Chinook and alike.

Preferably, water is supplied by the use of fire engines and fire hydrants closer to the fire.

Preferably, modular tanks are filled and loaded one at the time, by loading the first downloading device, interlocking, securing and deploying the downloading device, which on cue open the electro mechanic devices upon acceleration, thereby lifting the nose and enabling fluid to rush out the transporter.

BRIEF DESCRIPTION OF THE DRAWINGS

FIG. 6—A conceptual representations showing Cargo Tanks (FIG. 1) and a Cargo Downloading Device (25) inside an aircraft's cargo area performing a controlled downloading. The "First" Cargo Tank, the closest to the Cargo Downloading Device (25) is discharging, the front Louver Valves (32) are open, the tank's Waveless Buffer Lids (29) are open so air rushes in (43) nullifying any negative pressure or vacuum and is connected to the "Second" tank by the rear Louver Valves (32) which are open. The "Second" Cargo Tank front Louver Valves (31) are partially open restricting the water flow. All tanks under carriage are down, interlocked and secured to the aircraft. The Cargo Downloading Device (25) is extended, the Venturi Device (26) is taking air (34) and the water (36) is propelled by the Venturi's suction effect (35), aircraft's acceleration and gravity. The "Third and Fourth" Cargo Tanks remains stable, Louver Valves (30) and Waveless Buffer Lids (28) are closed.

FIG. 8—A conceptual representations showing Cargo Tanks (FIG. 1) and a Cargo Downloading Device (25) inside an aircraft's cargo area performing a controlled downloading. The "First" Cargo Tank, the closest to the Cargo Downloading Device (25) is discharging, the front Louver Valves (32) are open, the tank's Waveless Buffer Lids (29) are open so air rushes in (43) nullifying any negative pressure or vacuum and is connected to the "Second" tank by the rear Louver Valves (32) which are open. The "Second" Cargo Tank front Louver Valves (31) are partially open restricting the water flow. All tanks under carriage are down, interlocked and secured to the aircraft. The Cargo Downloading Device (25) is extended; the Stiffening Device (27) is taking air (34) keeping the Cargo Downloading Device straight. The water (37) is propelled by aircraft acceleration and gravity.

DETAILED DESCRIPTION OF INVENTION

Figure 1:
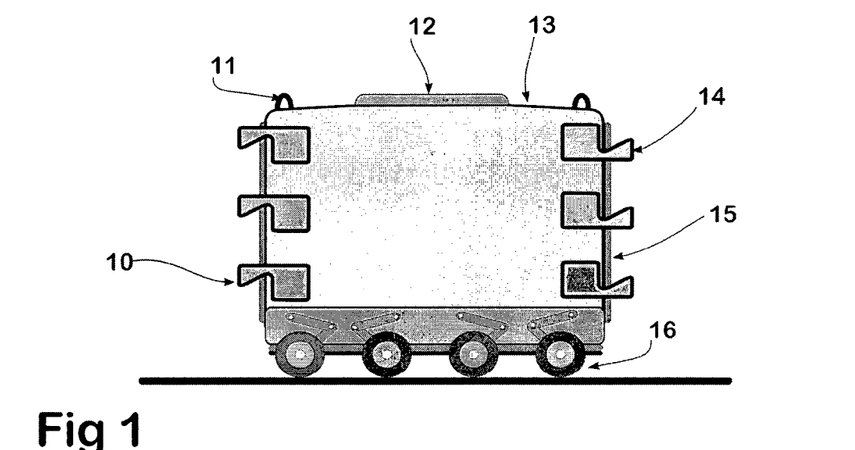
FIG. 1—Pictorial representation of a Modular Cargo Water Tank (Cargo Tank) side view, the collapsible under carriage (16) is up ready for transportation.
Figure 2:
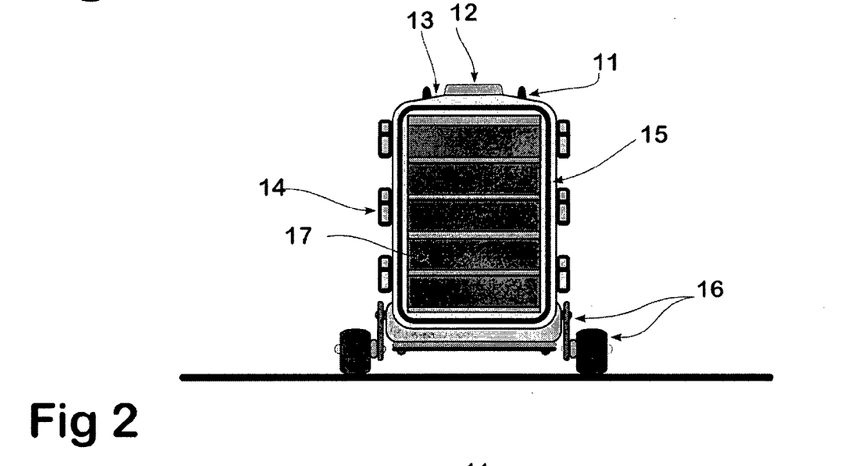
FIG. 2—Artistic impression of a Cargo Tank front view in the up position or ready for transportation, the Louvers Valves (17) are closed FIG. 3—Pictorial artistic impression of the Cargo Downloading Device front view in the up position or ready for transportation, the Cargo Downloading Device (21) is coiled for transportation.
Figure 3:
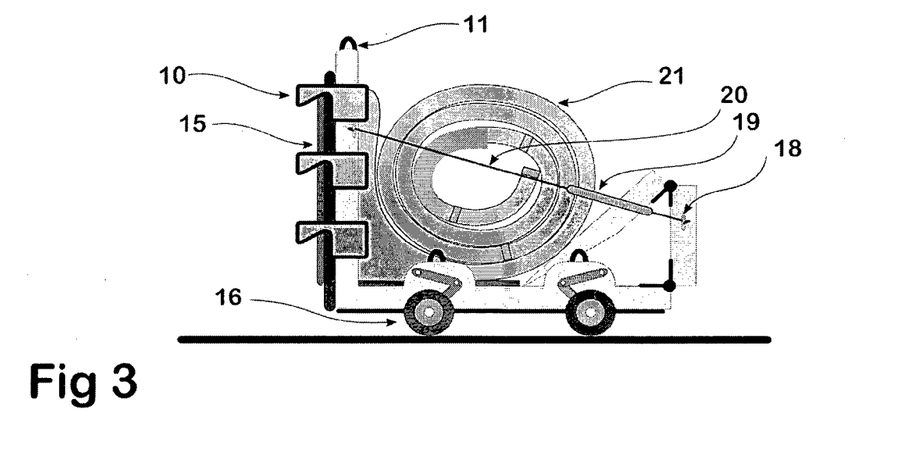
Figure 4:
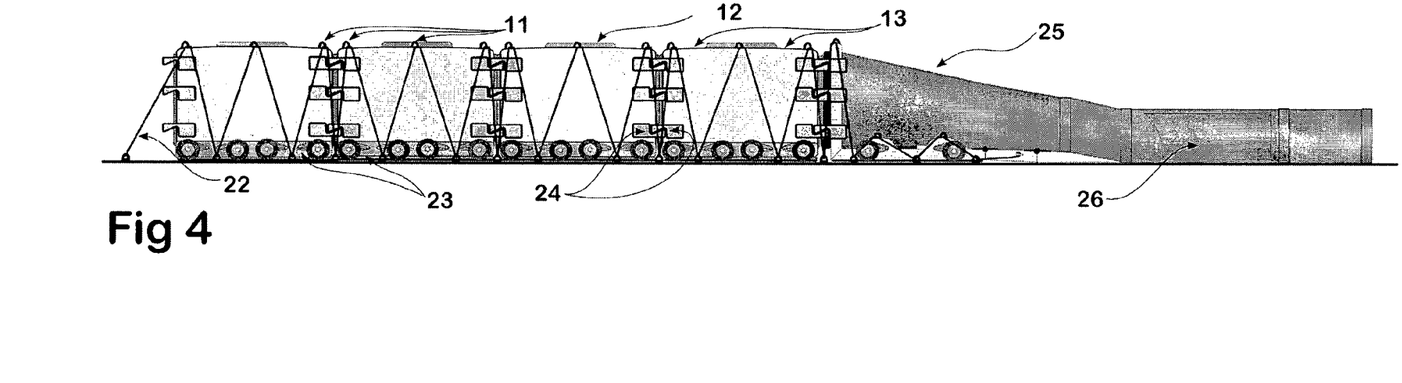
FIG. 4—A Pictorial representations showing Cargo Tanks (FIG. 1) and a Cargo Downloading Device (FIG. 3) inside and secured to the aircraft's cargo area, ready to download. All devices under carriage (23) are down (11, 22), interlocked (24), stable as a solid load and can form a large Cargo Tank on demand. The Cargo Downloading Device (25) is extended and furnished with a Venturi Device (26) attached.
Figure 5:
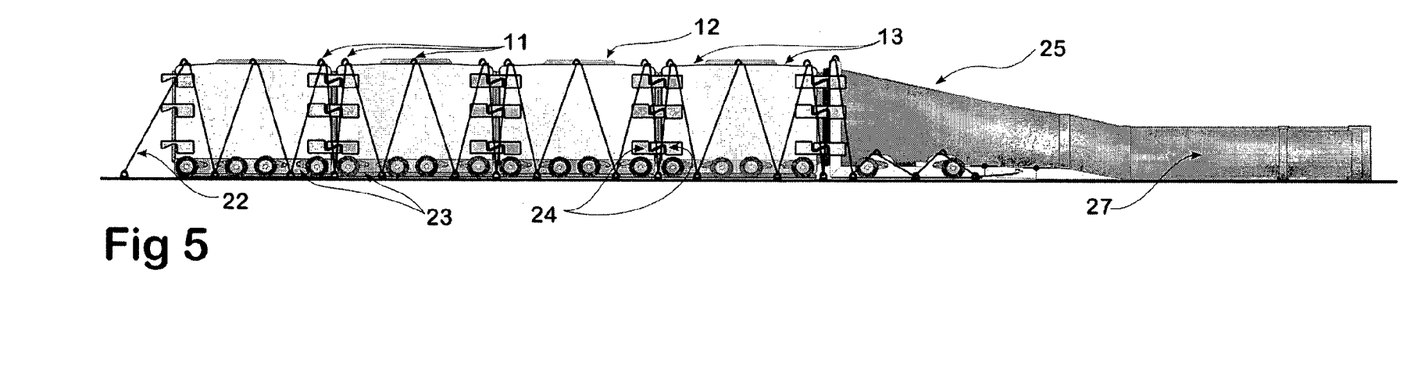
FIG. 5—A Pictorial representations showing Cargo Tanks (FIG. 1) and a Cargo Downloading Device (FIG. 3) inside and secured to the aircraft's cargo area, ready to download. All devices under carriage (23) are down (11, 12), interlocked (24), stable as a solid load and can form a large tank on demand. The Cargo Downloading Device (25) is extended and furnished with a Stiffening Device (27) attached.
Figure 6:
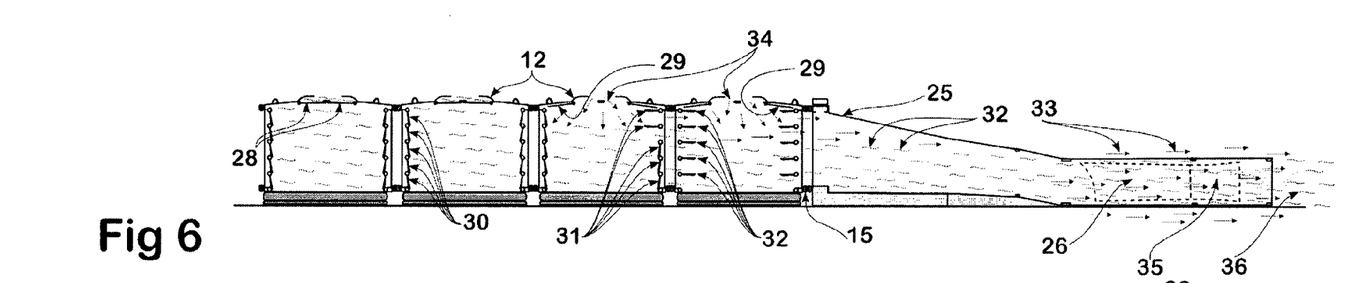
Figure 7:
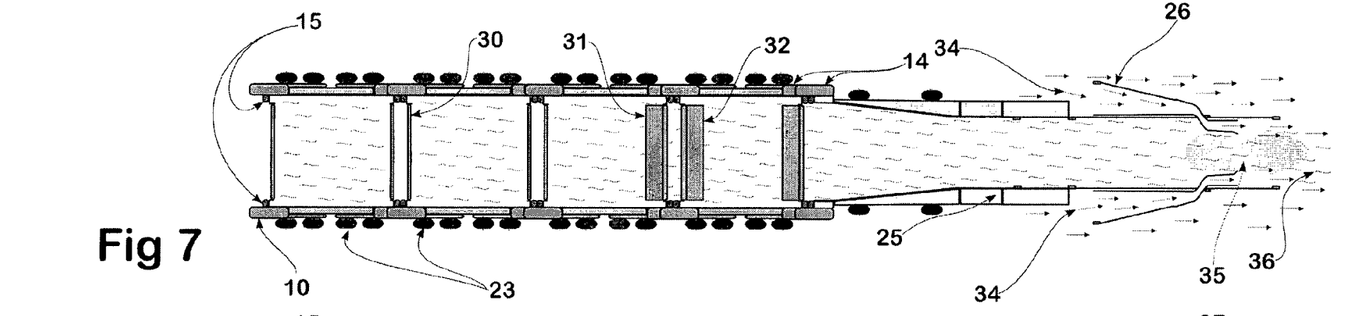
FIG. 7—Bird eyes view of FIG. 6
Figure 8:
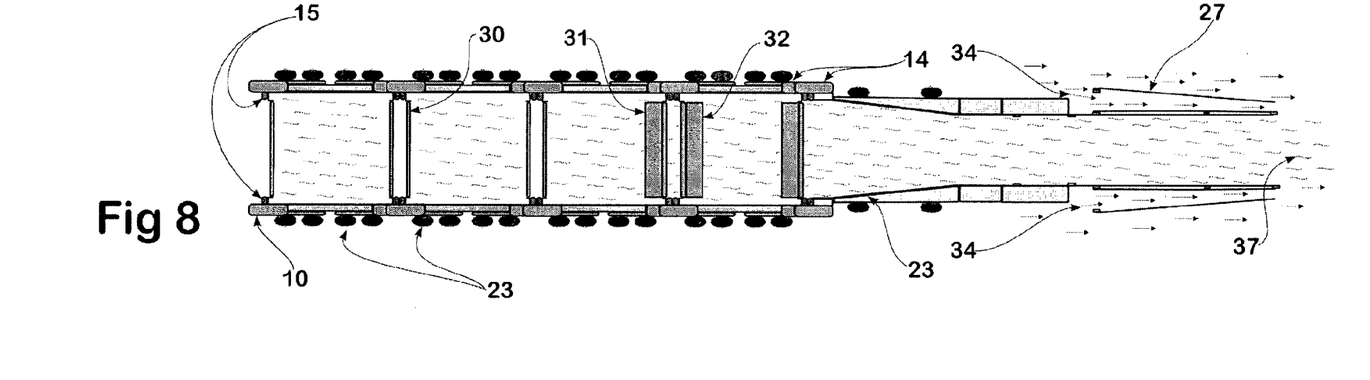
Figure 9:
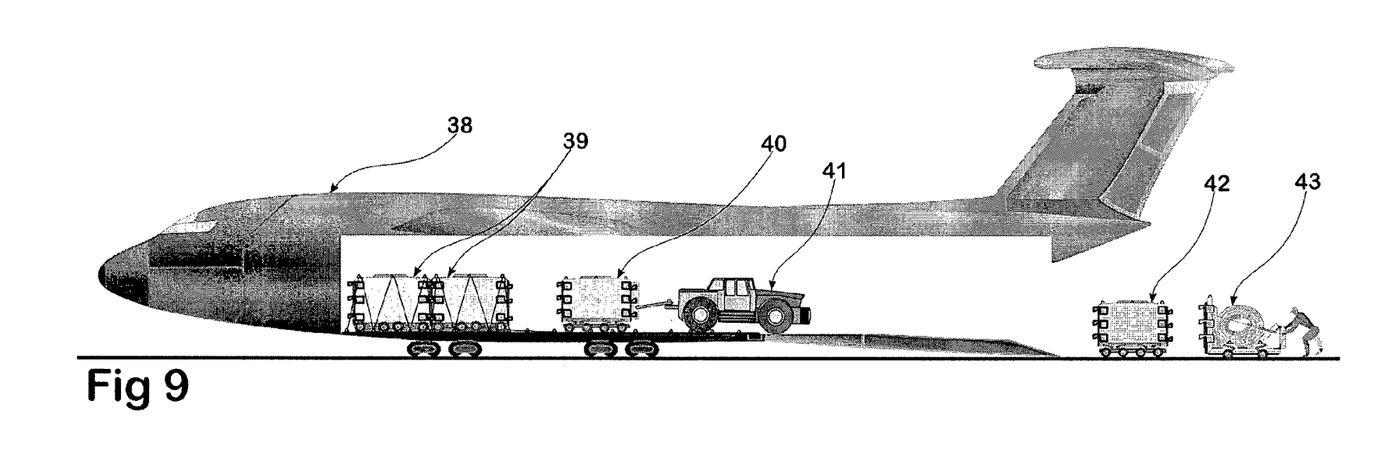
FIG. 9—A pictorial representations of a C5 Galaxy Transporter (38) typical loading operation, two Cargo Tanks (39) are secured to the aircraft a third Cargo Tank (40) is driven by a Tractor (41) into position, the last Cargo Tank (42) is waiting to be driven into position and the Cargo Downloading Device (43) is manually driven toward the aircraft.
Figure 10:
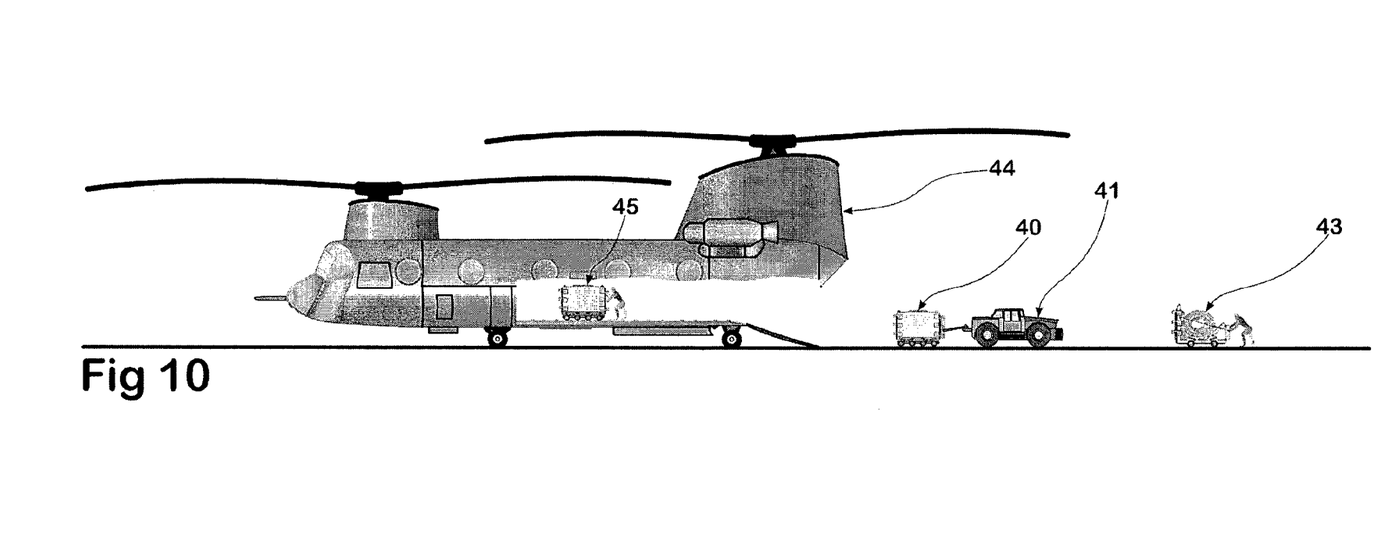
FIG. 10—A pictorial representations of a Chinook Helicopter typical loading operation a Cargo Tanks (40) is driven toward the aircraft by the Tractor (41), the second Cargo Tank (45) is manually positioned and the Cargo Downloading Devices (43) is manually driven toward the aircraft.
Figure 11:
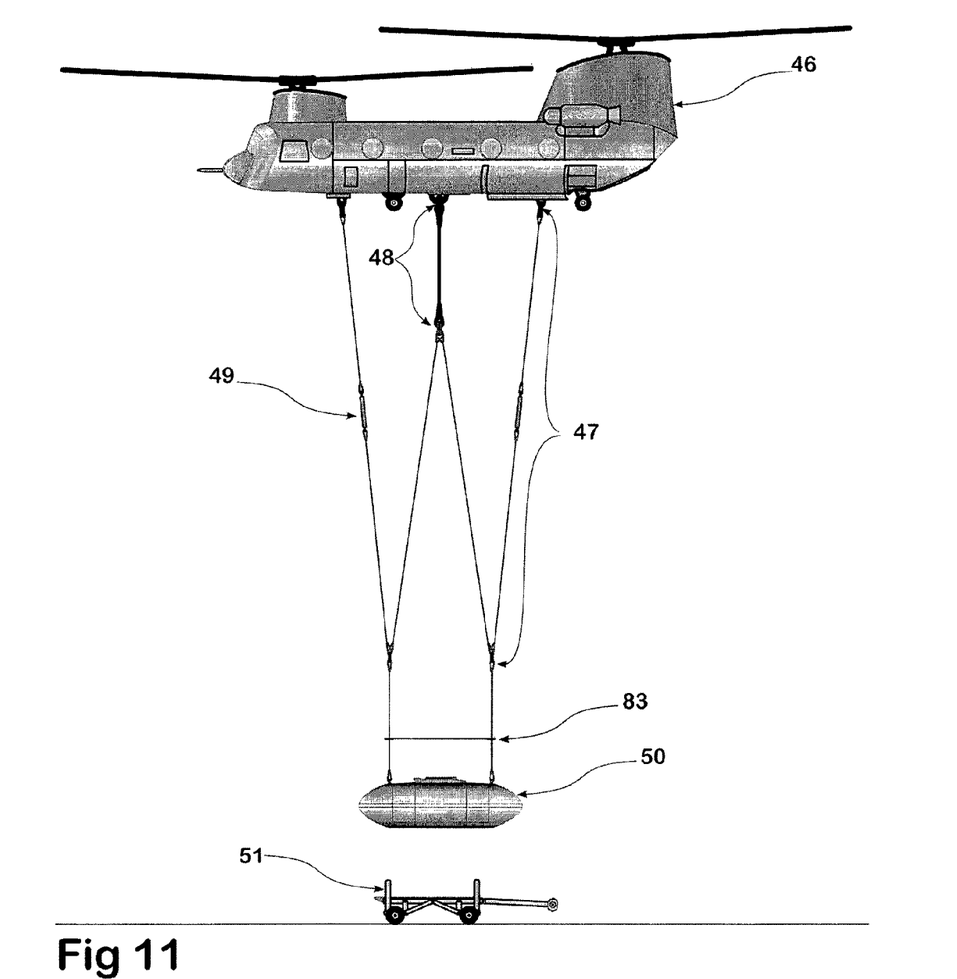
FIG. 11—A pictorial representations of a Chinook Helicopter lifting a Pendant Modular Water Tank (Pendant Tank) (50) from the Ground Transporter Frame (Ground Frame) (51). The load is secured by Heavy Lifting Rope (48) and Stabilizing Ropes (47). The Ground Frame (51) is left behind. The only reason of Ground Frames (51) usage is to reduce the tanks weight and Anti-tangle Frame designed to facilitate the re-hocking operation. The central hook is designed to take the full load, the rear and front hooks are used to stabilize the load and minimize the "Pendulum Effect" with four shock absorber compensators capable to restraint sudden movements in four directions.
Figure 12:
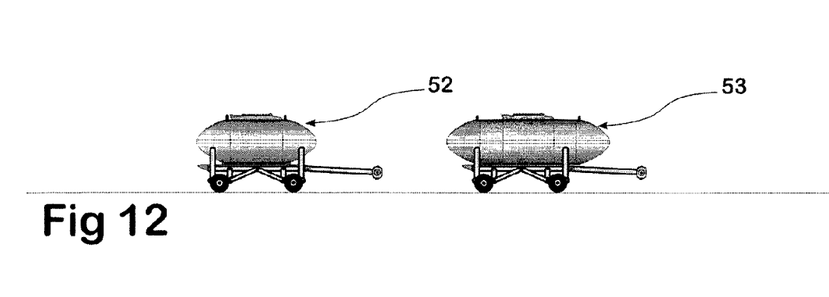
FIG. 12—A pictorial representations of Pendants Water Tanks (52 and 53) with different water capacity FIG. 13—A pictorial representations of a Chinook Helicopter (54) flying with a Pendant Tank (56), the load is secured by elongated Heavy Lifting Ropes (55) and Stabilising Ropes (47), the complete harness sets are elongated to minimize the wind effect on the ground generated by helicopter impellers. The Ground Frame (57) is left behind.
Figure 13:
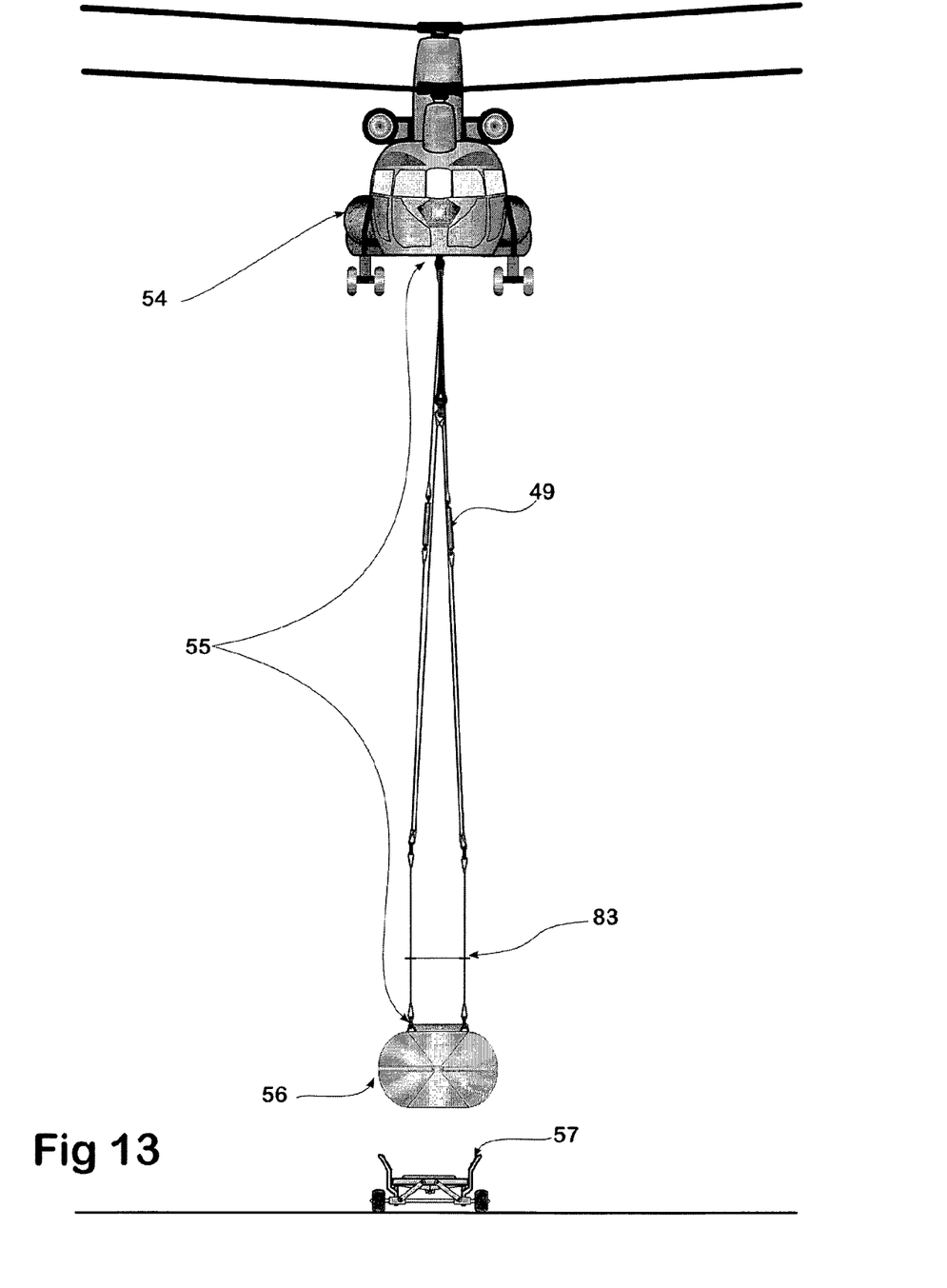
Figure 14:
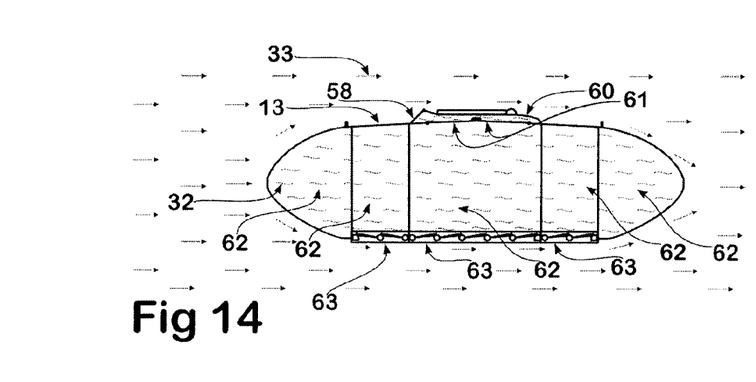
FIG. 14—A conceptual representation shows a Pendant Tank loaded. This tank has five Sections (62) which are aerodynamic and liquid flow friendly especially the ends. The Tank Filling Lid (59), the Waveless Buffer Lids (61), the Waveless Buffer Air Inlet Valve (58) and the bottom Louver Valves (63) are closed therefore the tank's load remains stable as a solid load.
Figure 15:
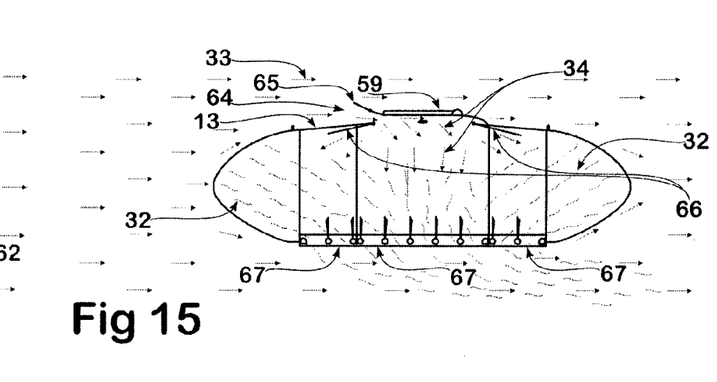
FIG. 15—A conceptual representation shows a Pendant Tank unloading. The Pendant Tank is dumping the load. The Tank Filling Lid (59) remains close; the Waveless Buffer Lids (66), the Waveless Buffer Air Inlet Valve (65) and the bottom Louver Valves (67) are fully open. Air rushes in (34) at the top nullifying any negative pressure or vacuum and the water is falling freely at the bottom by gravity only. If the Pendant Tank is immersed in deep enough water it will fill up fast and without mechanical means.
Figure 16:
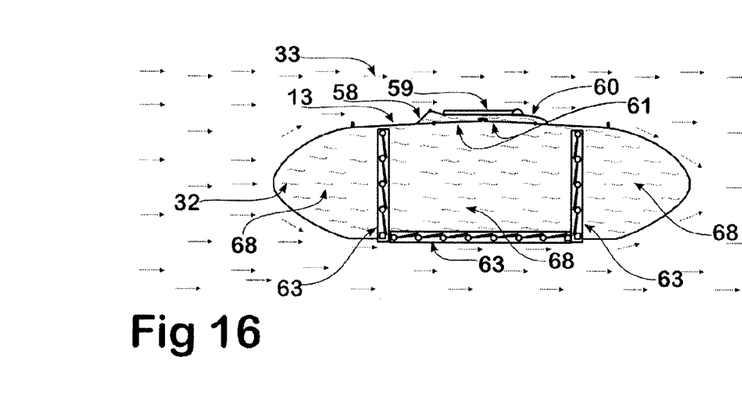
FIG. 16—A conceptual representation shows a Pendant Tank loaded. This tank has three Sections (68) which are aerodynamic and liquid flow friendly especially the ends. The Tank Filling Lid (59), the Waveless Buffer Lids (61), the Waveless Buffer Air Inlet Valve (58), the dividing Louver Valves (63) and the bottom Louver Valves (63) are closed therefore the tank's load remains as stable as a solid load.
Figure 17:
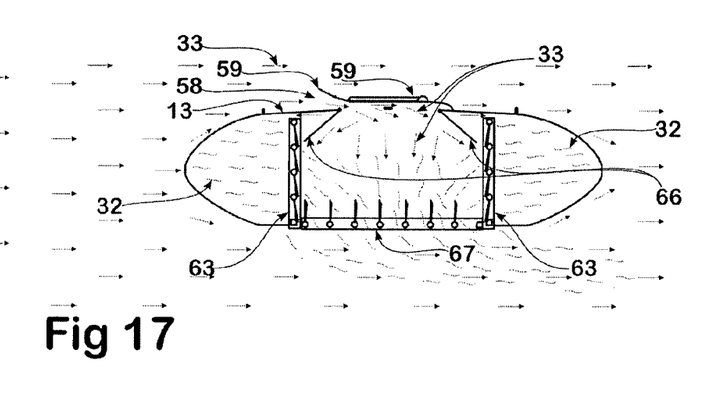
FIG. 17—A conceptual representation shows a Pendant Tank unloading. The tank is dumping half of the load. The Tank Filling Lid (59) and dividing Louver Valves (63) remains close; the Waveless Buffer Lids (66), the Waveless Buffer Air Inlet Valve (59) and the bottom Louver Valves (67) are fully open. Air rushes in (34) at the top nullifying any negative pressure or vacuum and half of the water is falling freely at the bottom only by gravity. The dividing Louver Valves (63) have gap at the top to avoid pockets of air hence maintaining the tanks Waveless Top Profile (13) integrity.
Figure 18:
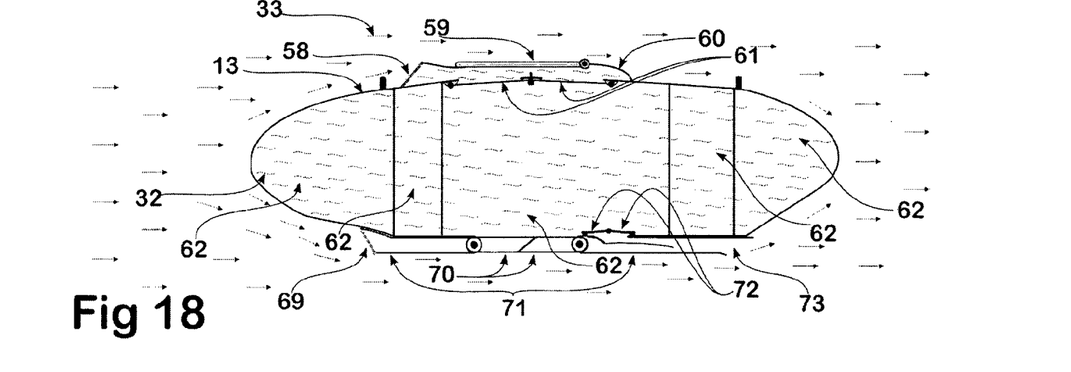
FIG. 18 A conceptual representations shows a Pendant Tank loaded and stable. This tank has five Sections (62) which are aerodynamic and liquid flow friendly especially the ends; a Venturi Device (71) and Dumping Gates (70) are installed at the bottom. The Waveless Buffer Lids (61), the Waveless Buffer Air Inlet Valve (58), and the Bottom Water Gate (70) are closed. The Venturi Device Air Inlet Valve (69) and the Venturi Water Valve (72) are closed rendering this device inactive.
Figure 19:
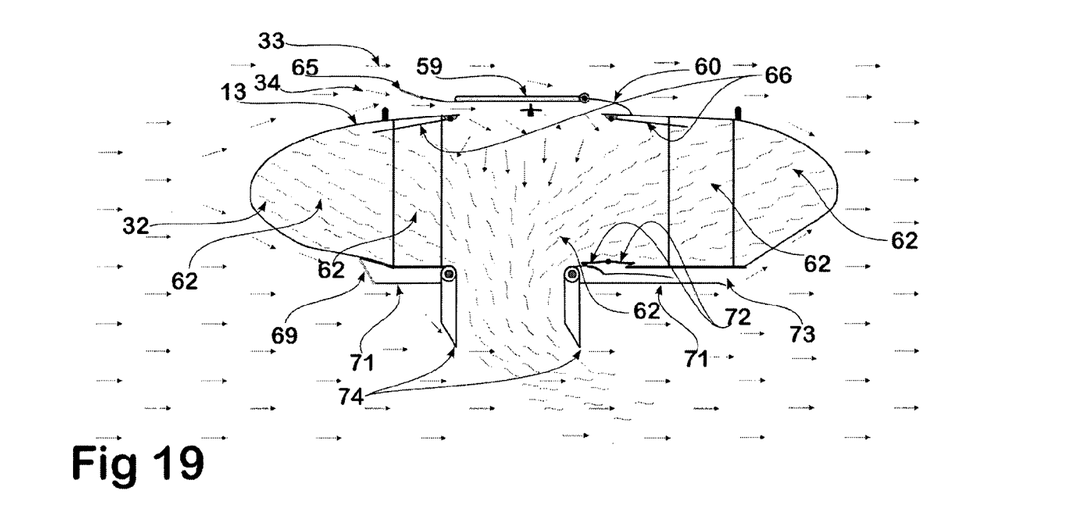
FIG. 19—A conceptual representation shows a Pendant Tank unloading. The tank is dumping the load. The Venturi Device Inlet Valve (69) and the Venturi Device Water Valve (72) are closed rendering the Venturi Device inactive (71). The Tanks Filling Opening Lids (59) remains close; the Waveless Buffer Lids (66), the Waveless Buffer Air Inlet Valve (65) and the Bottom Water Gate (74) are fully open. Air rushes in (34) at the top nullifying any negative pressure or vacuum and the water is falling freely at the bottom by gravity only.
Figure 20:
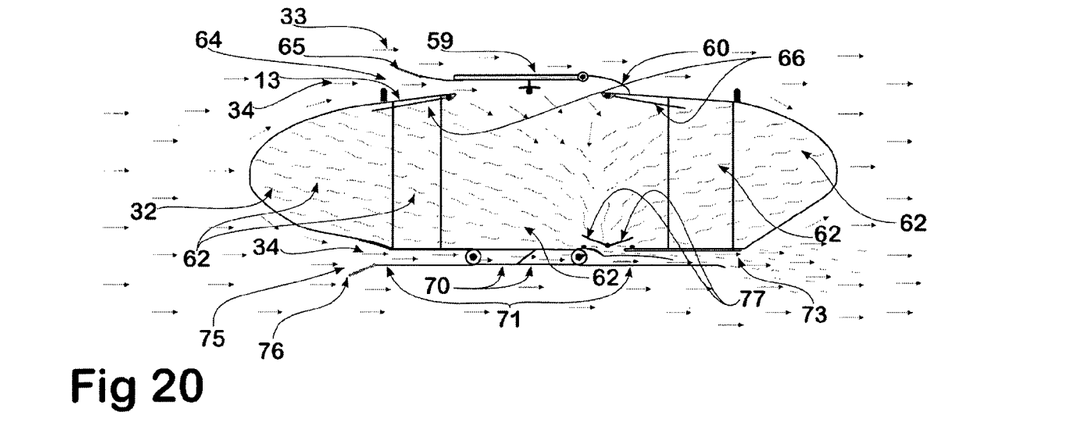
FIG. 20—A conceptual representation shows a Pendant Tank unloading. The Tanks Filling Opening Lids (59) remains closed, the Waveless Buffer Lids (66) and the Waveless Buffer Air Inlet Valve (65) are open. The Air Rushes In (34) at the top nullifying any negative pressure or vacuum. The Venturi Inlet Valve (76) and the Venturi Water Valve (77) are open and depending in the quantity of water supplied and the passing wind speed and direction the Venturi Device (71) produces from heavy droplets all the way down to a fine spray.
Figure 21:
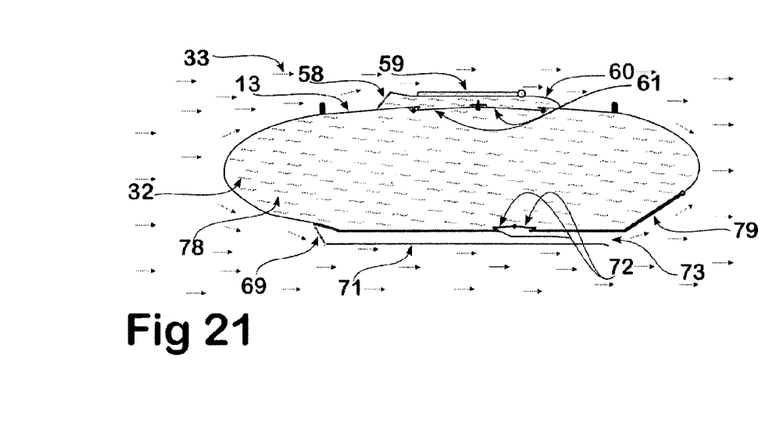
FIG. 21—A conceptual representation shows a Pendant Tank loaded and stable. This tank has one Section (78) which is aerodynamic and liquid flow friendly, a Rear Water Gate (79) and a Venturi Device (71) at the bottom. The Tank Filling Opening Lid (59), the Waveless Buffer Lids (61), the Waveless Buffer Air Inlet Valve (58) and the Tank Rear Water Gate (79) are closed. The Venturi Device Air Inlet Valve (69) and the Venturi Device Water Valve (72) are closed rendering this device inactive.
Figure 22:
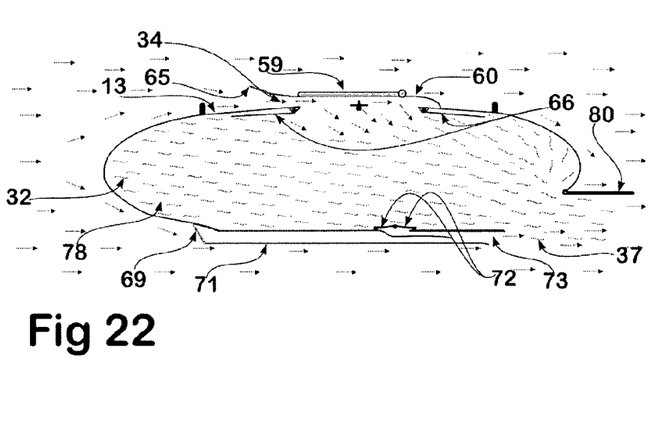
FIG. 22—A conceptual representation shows a Pendant Tank unloading. The tank is dumping the load. The Venturis Device Inlet Valve (69) and The Venturi Device Water Valve (72) are closed rendering this device inactive. The Tank Filling Opening Lid (59) remains close; the Waveless Buffer Lids (66) and the Waveless Buffer Air Inlet Valve (65) are fully open. Air Rushes In (34) at the top nullifying any negative pressure or vacuum and the water is falling freely at the rear by gravity only.
Figure 23:
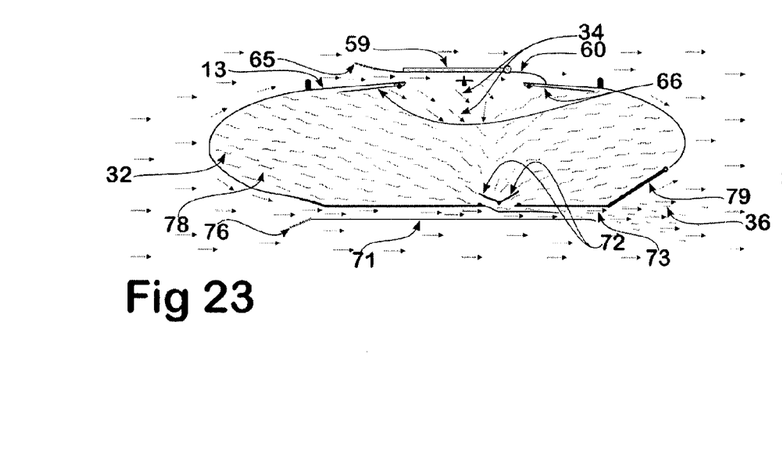
FIG. 23—A conceptual representation shows a Pendant Tank unloading. The Tank Filling Opening Lid (59) and Tank Rear Water Gate (79) remains close, the Waveless Buffer Lids (66) and the Waveless Buffer Air Inlet Valve (66) are open, the Air Rushes In (34) at the top nullifying any negative pressure or vacuum. The Venturis Device Inlet Valve (76) and the Venturi Device Water Valve (72) are open and depending in the quantity of water supplied and passing wind speed and direction, the Venturi Device (71) can produce from heavy droplets all the way down to a fine spray.
Figure 24:
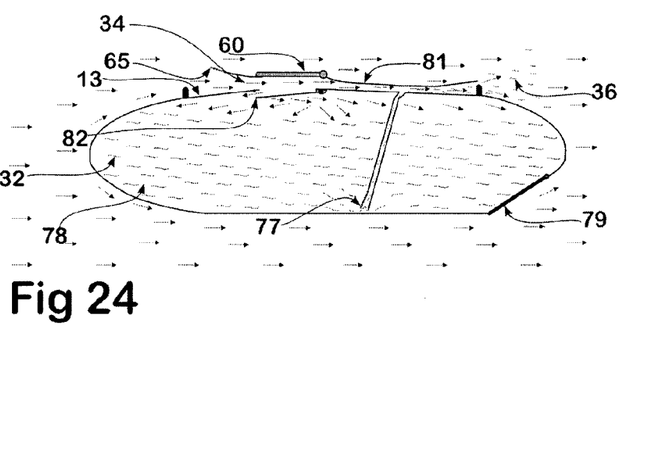
FIG. 24—A conceptual representation shows a Pendant unloading. This tank has one Section (78) which is aerodynamic and liquid flow friendly, a Tank Rear Water Gate (79) and a Venturi Device (81) at the top. The Tanks Filling Opening Lid (60) and the Tank Rear Water Gate (79) remains closed, the Venturi Device Air Inlet Valve (65) is fully open and the Tank Waveless Lid (82) is partially open, the Air Rushes In (34) at the top nullifying any negative pressure or vacuum. The Venturi Device Air Inlet Valve (83) and the Venturi Device Water Valve (84) are open and depending in the quantity of water supplied and the passing wind speed and direction the Venturi Device (81) can produce from heavy droplets all the way down to a fine spray.
Figure 25:
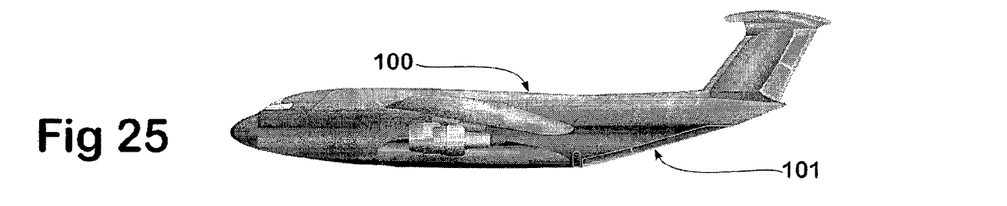
FIG. 25—A pictorial representations of a C5 Galaxy Transporter (100) cruising loaded toward the designated area by Ground Control; this aircraft is currently one of the biggest Army Transporter and is capable to carry a payload of 125,000 kg or liters of water per trip. The Rear Gate (101) is closed.
Figure 26:
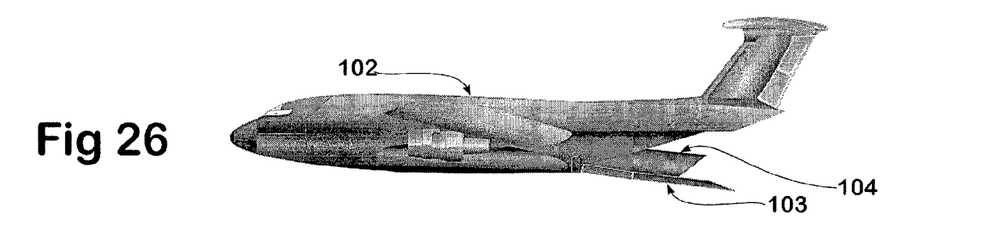
FIG. 26—A pictorial representations of a C5 Galaxy or C17 (102) ready to download, the aircraft slow down to the minimum speed, the Rear Gate (103) is open and Cargo the Downloading Device (104) deployed.
Figure 27:
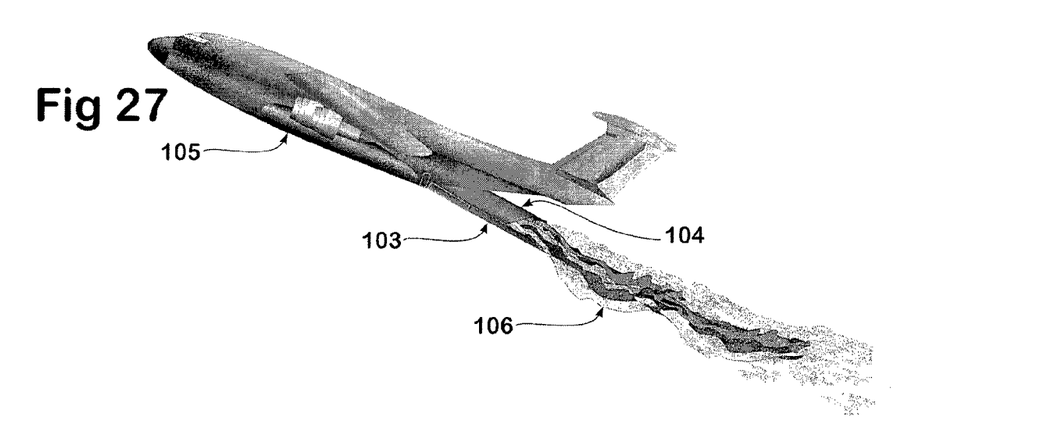
FIG. 27—A pictorial representations of a C5 Galaxy or C17 (105) downloading, the Rear Gate (103) is open and the Cargo Downloading Device (104) begins to discharge as soon as the aircraft accelerate and lift the nose as much as possible and open the Cargo Tanks Louver Valves as instructed by Ground Control. The water is propelled ideally at the ground wind speed and direction by the combination of the aircraft flying angle, the aircraft sudden acceleration and gravity.
Figure 28:
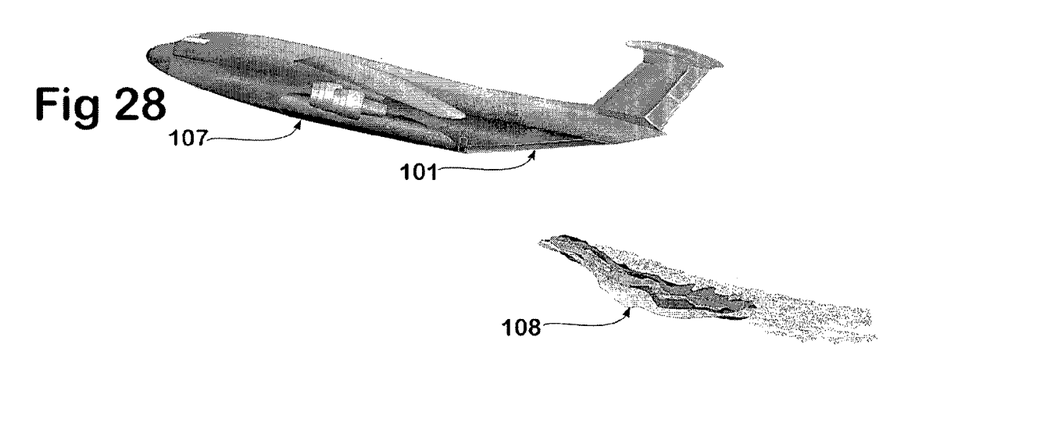
FIG. 28—A pictorial representations of a C5 Galaxy or C17 (108) returning to cruse mode and back to base, the Rear Gate is closed and the Propelled Water (108) keeps going down.
Figure 29:
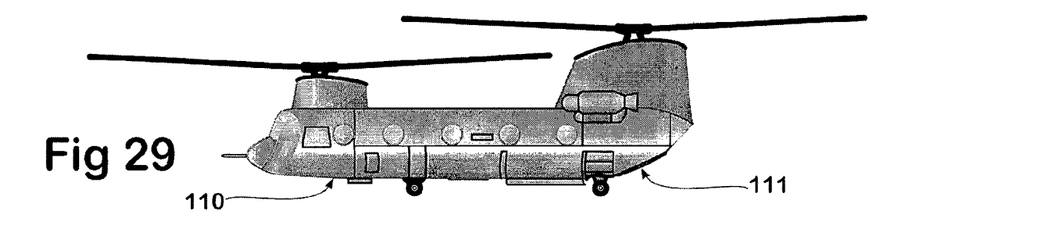
FIG. 29—A pictorial representations of a Chinook Helicopter (110) cursing loaded toward the designated area by Ground Control; this helicopter is one of the biggest Army Transporter and is capable to carry from 10,000 to 15,000 liters of water per trip. The Rear Gate (111) is closed FIG. 30—A pictorial representations of a Chinook Helicopter (112) ready to download; the Helicopter slow down, open the rear gate and deploy a Cargo Downloading Device (114).
Figure 30:
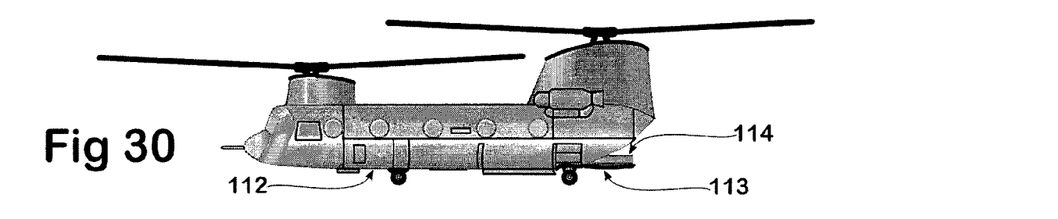
Figures 31, 32:
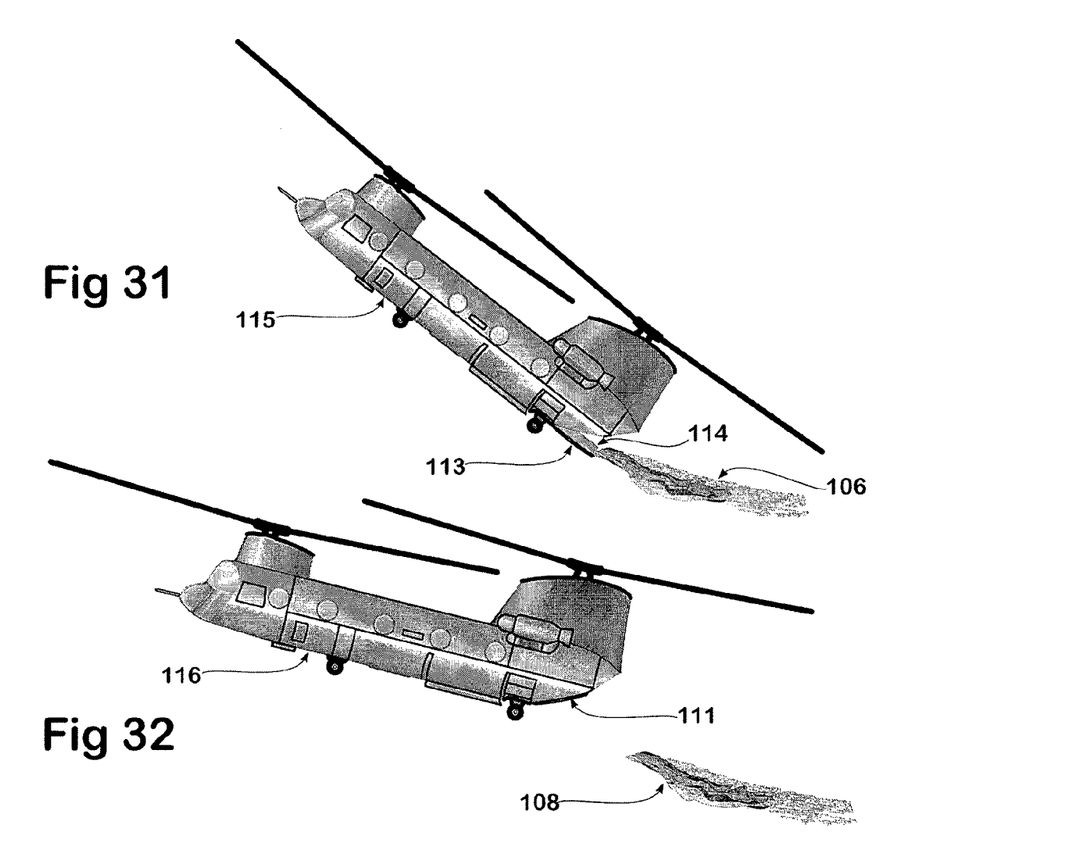
FIG. 31—A pictorial representations of a Chinook Helicopter (115) downloading, the Rear Gate (113) is open and the Cargo Downloading Device (114) begins to discharge as soon as the chopper lift the nose as much as required, suddenly accelerate and open the Cargo Water Tank Louver Valves as instructed by Ground Control. The water is propelled ideally at the ground wind speed and direction by the combination of the chopper angular position, the chopper sudden acceleration and gravity.
FIG. 32—A pictorial representations of a Chinook Helicopter (116) returning to cruse mode and back to reload, the Rear Gate (111) is closed and the Propelled Water (108) keeps going down.
Figure 33:
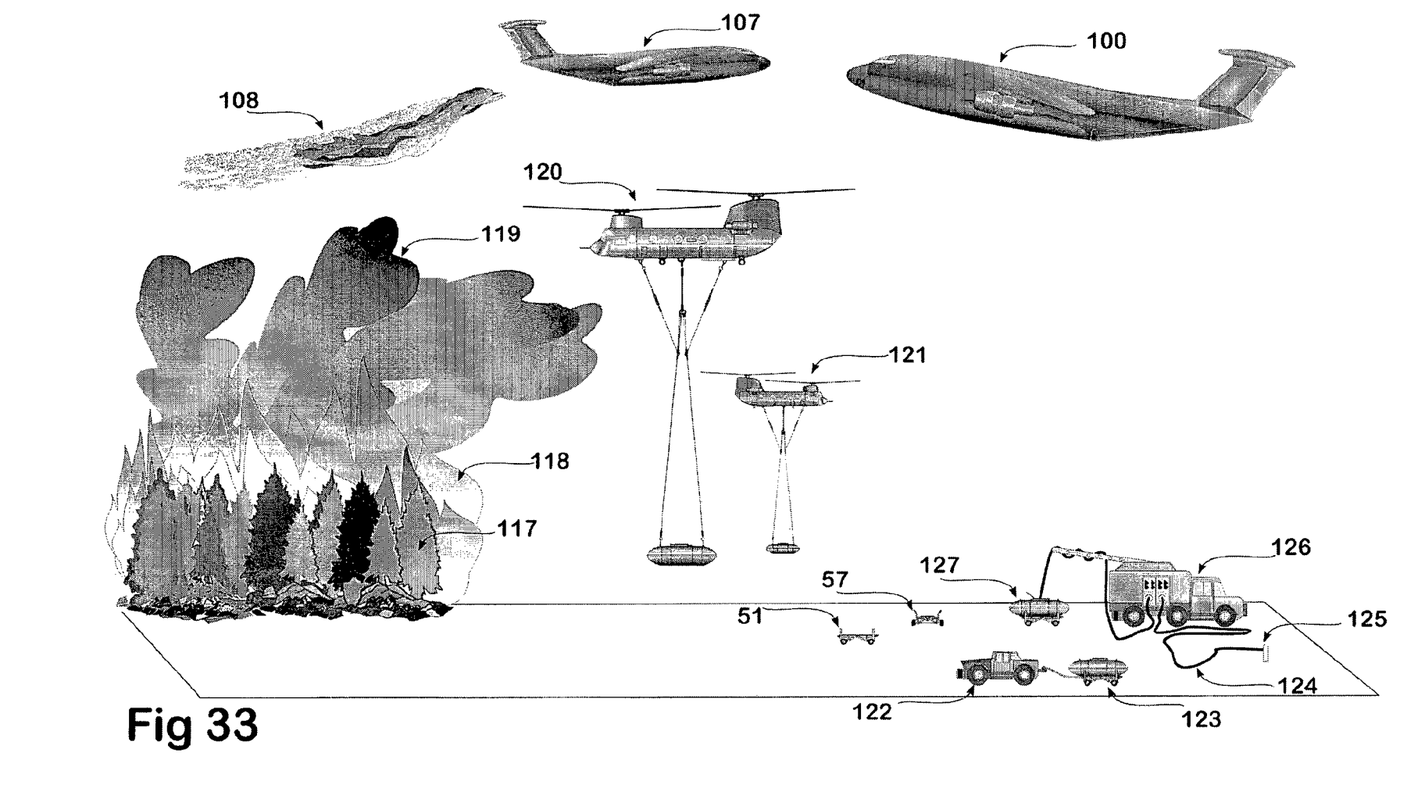
FIG. 33—A pictorial representation of several heavy transporters aircrafts working to control a bush fire, the Chinook Helicopters (120-121) refilling station is a clearance close to a Fire Hydrant (125) which is connected to the Fire Engine (126) by a Fire Hose (124), the Fire Engine (126) outlet is filling a Pendant Tank (127), The Truck (122) is towing a Pendant Tank (123) toward the pickup area, the Chinook (120) is flying toward the Bush Fire (118), the Chinook (121) is returning to be reloaded, the C5 (100) is flying toward the fire, the C5 (107) is returning to be reloaded and the Propelled Water (108) is dropping toward the fire.

The present invention relates to the means that allows helicopters and Transport Aircrafts with rear or tail gate to carry or lift liquid compounds to fumigate, spray or a single massive drop for the purposes such as irrigation, chemical treatment and fire control; with no modification to the aircrafts thus preserving intact the aircrafts original integrity and applications The invention requires unmodified aircrafts. To achieve the aircrafts optimal effectiveness Ground Data, Control and Logistic support are required. The invention's technological advantages are Special Purpose Tanks and Downloading Devices which are driven by the passing wind, the inertia produced by the aircraft sudden and powerful acceleration, the gravity by raising the front end, the capacity to fly low, slow and agility to negotiate almost any terrain and the ability to carry or lift almost any type of load. On cue the air thrust and inertia are applied to novels venturis or straightening devices, the offloading devices propels the liquid load as fumes, thin or thick sprays or as a massive drop on demand or as directed by Ground Control.

Our preferred application is aerial fire fighting with water, fire retardants or mixture of both, which we will refer to as water. The invention facilitates the usage of any unmodified transport aircrafts making possible to mobilize all transporter aircraft available which includes the biggest and most powerful transporters to fight fires. Unmodified Fixed Wing Transporters will be loaded with Special Purpose Tanks and Helicopters lift Special Purpose Tanks. The Special Purpose Tanks need to be modular to deal with aircrafts various lifting capabilities. Our preferred configuration is to divide the load into manageable modules which are linkable, lockable and connectable and able to form a single larger tank or several small tanks s required.

In a preferred embodiment, the tanks are aerodynamic, organic shape or liquid flow friendly so as to cope with gusty winds when the tanks are transported externally, or to facilitate a free flow of water during downloading or self re-loading as the tanks may go under water to be refilled faster without ancillary equipment. The Special Purpose Tanks are steady in order to maintain aircraft stability as well controllable for speedy loading. Waveless Water Tanks are as stable as a solid load; this is achieved by raising the Tanks Top Profile which leads toward the Tank Waveless Buffer. The Tank Waveless Buffer at the top keeps the Tank Waveless Buffer Lids completely under the water to ensure the absence of air pockets and the water inside the tank is stable as a solid load because water cannot be compressed. The hinges of the Waveless Buffer Lids have and small penetration at the top, to evacuate airlocks and avoid pressure variations as the water changes in temperature with altitude or full tanks left overnight. The gap between linked tanks must be kept to an absolute minimum or an air relief valve will be required to avoid instability.

The absence of electro-mechanical apparatus to drive the Tank Downloading Device makes the Special Purpose Tanks a light weight device; the Tank Download Device's energy source is a combination of gravity, aircraft acceleration, aircraft position, the speed of the passing wind which depends on the aircraft speed and the intensity and direction of the surrounding wind. The thrust of the passing air is applied to novel Venturi's configurations producing a natural vacuum; this vacuum produces a suction which drags the liquid to under, equal or over the prevalent wind speed. A predetermined amount of liquid is provided to produce a desired effect as follows: a relative small amount of water and a relative large difference between liquid and wind speed produces a fine mist, a relative large amount of water propelled closest to speed and wind direction produces a heavy downfall capable of forming significant cooling puddle of water on the ground.

The simplest and prefer downloading device is a compatible shut which increases the transversal area gradually toward the end, as the aircrafts accelerate and lift the nose the water is virtually left behind.

This invention makes possible to mass hundreds of thousands of liters of water up in the air at once and millions of liters in a day. The present invention allows extinguishing almost any fire because of the method of downloading drops onto a forest or bush fire with 1.1 million liters of water with 8 C-5 Galaxies from the USA Air Force. There are available about 175 C-5s at the moment and there are far too many unused transporters all over the world as opposed to fire fighting aircrafts which are expensive to hire. Rich and poor countries will have the means to fight large fires more effectively and at low cost.

The water availability and logistic constrains are the most likely factor to determine the number of aircrafts that can be used as a water bomber.

The idea of propelling the liquid at the speed and direction of the wind follows simple principles. If a water hose outlet faces the direction of the wind the water goes further, remains compact and form puddles; if the water hose outlet faces the opposite direction of the wind, the water breaks into a spray, wetting a larger area and does not form any puddle.

Transporter aircrafts which are by design the most powerful flying machines require, for vital safety reasons, a short takeoff and landing minimizing the aircraft exposure in hostile areas. Transporter aircrafts are agile to negotiate difficult and hostile terrains at low altitude, capable to fly slowly to allow humans to parachute and drop supplies, hence are ideal to drop water to difficult areas affected by large fires at low altitude and speed increasing the efficiency of the water. Fixed wind aircraft at take off on a short runway need to lift the nose close to 45°. In a fire fighting situation, the aircraft is ready to discharge the water and the pilot is instructed by the ground control. Following instructions, the aircraft accelerates as fast as possible tilting the nose upward. The resulting force generated by the sudden acceleration (inertia) and gravity will push the water out without the help of electro-mechanical means. The passing air may be used to deploy and stiffen the downloading device. Chinook pilots may position the aircraft almost still up to 60° on demand making the downloading from this type of helicopters a good proposition. Discharging or downloading large volumes of water may develop into a safety issue for people, animals and property on the ground. Hence, the amount of water that can be discharged from the containers needs to be adequately controlled to ensure that people and animals in particular are not injured.

If an aircraft travels at 300 Km/hr, for example, and the wind in the opposite direction is measured at 80 Km/Hr, to match the wind speed the load must be propelled at 380 Km/Hr. However, if an aircraft travels at say 300 Km/hr and the wind in the same direction at 80 Km/Hr to match the wind speed the load must be propelled at 220 Km/Hr which is a feasible proposition requiring 60% efficiency of Venturis Downloading Devices to achieve the minimum water dispersion and the maximum efficiency without taken into consideration the influence of aircraft position, acceleration and gravity.

Airports are a high risk fire area; consequently the water supply and fire retardant mixing availability are second to none for the reasons of a relentless traffic and volatile fuels. The addition of a station to fill up water tanks for helicopters and fixed wind transport is possible and needs to be planned in advance to satisfy the new fire fighting aircrafts now available.

Fire engines are equipped with powerful water pumps currently from 1,200 to 4,500 ltrs/min. Helicopters can use the combination of fire engines and the hydrants closest to a clearance as sport fields, parks, freeway, the local playground or a suburbia wide street without overhead wires, thereby increasing the viability of use of such aircraft in fire affected areas. In one embodiment, fire engines fill tanks with water, water loaded tanks are conveniently positioned, a chopper attaches a tank without landing in less than half a minute, ensuring that the lifting ropes are sufficiently long to minimize the impeller's wind interfering at ground level. This method of filling of tanks reduces the round trip time and increases the helicopters fire fighting effectiveness. These locations for filling tanks should be clearly identified. The areas selected must include the most vulnerable areas known to the corresponding local authorities. Towns are normally located close to water sources as lakes and dams ensuring a constant water supply to the population, coastal township have the sea nearby and for that reason it is highly probable to find deep sources of water closer to a fire and consequently the tanks need to have the capability to be self refilled by immersing the tank into a lake, dam or the sea, thereby reducing logistic requirements.

Elements Numbers

10—Cargo Tank locking device top
11—Cargo Tank anchor point
12—Cargo Tank waveless buffers and filling inlet
13—Tanks waveless top profile
14—Cargo Tank locking device bottom
15—Cargo Tank seal (between tanks)
16—Collapsible under carriage shown in the up or transport position
17—Louvers Valves shown in the closed position
18—Cargo Downloading Device anchor
19—Cargo downloading spring loaded tensor
20—Cargo Downloading Device cable
21—Cargo Downloading Device shown in the transport position
22—Fastening rope or chain
23—Collapsible under carriage shown in the down or flying position
24—Cargo Tanks locking devices in the locked position
25—Cargo Downloading Device, the flexible duct is in the downloading position
26—Venturi Device
27—Stiffening Device
28—Closed Waveless Buffer's lids immersed in water in the waveless position
29—Open Waveless Buffer's lids, allowing air to rush in
30—Louvers Valves shown in the closed position
31—Louvers Valves top two rows are open and the rest are closed
32—Louvers Valves all open
32—Water flow directions
33—Wind or air directions
34—Air rushing in
35—A pictorial representations of the Venturi's vacuum area
36—Water propelled by the venturi's vacuum, acceleration and gravity
37—Water propelled by acceleration and gravity
38—C5 Galaxy Transporter being loaded with Cargo Tanks and a Cargo Downloading Device
39—Cargo Tanks locked in the flying position
40—A Cargo Tank driven toward the flying position
41—A Tractor pushing a Cargo Tank toward the flying position
42—A Cargo Tank waiting to be loaded
43—A Cargo Downloading Device being manually driven to be loaded
44—A Chinook Helicopter being loaded with Cargo Tanks and a Cargo Downloading Device
45—A Cargo Tank being manually driven toward the flying position
46—A Chinook Helicopter flying with a Pendant Tank side view
47—Stabilizing Ropes and corresponding slings
48—Heavy Lifting Ropes and corresponding slings
49—Shock Absorber
50—A Pendant Tank being transported by a Chinook
51—A Pendant Tank Ground Frame left behind side view
52—A small Pendant Tank says for 10,000 liters
53 A large Pendant Tank says for 15,000 liters
54—A Chinook Helicopter front view, flying with a Pendant Tank
55—Heavy lifting ropes and corresponding slings, elongated to minimize the propellers downward fanning effect
56—A Pendant Tank front view
57—A Pendant Tank Ground Frame left behind front view
58—Waveless Buffer Air Intake Valve in the close position
59—Pendant Tank Filling Lid in the close position
60—Waveless Buffer
61—Waveless Buffer's lids in the waveless position
62—Pendant Tanks five sections
63—Pendant Tank bottom or dumping Louvers Valves in the close position
64—Waveless Buffer air intake
65—Waveless Buffer Air Intake Valve in the open position
66—Waveless Buffer Lids in the open position allowing air to rush in
67—Pendant Tank bottom or dumping Louvers Valve in the open position, dumping the load
68—Pendant Tanks three sections
69—Venturi's Air Intake Valve in the close position
70—Venturi's Dumping Gates in the close position
71—Venturi Device located at the bottom
72—Venturi's water valve in the close position
73—Venturi's water and air outlet
74—Venturi's Dumping Gates in the open position
75—Venturi's air intake
76—Venturi's Air Intake Valve in the open position
77—Venturi's Water Valve in the open position
78—Pendant Tanks one section
79—Pendant Tank Rear Dumping Gate in the close position
80—Pendant Tank Rear Dumping Gate in the open position, dumping the load
81—Venturi located at the top
82—Waveless Buffer Lid in the open position, allows air to rush in
83—Anti-tangle Frame
100—A C5 Galaxy loaded, the Rear Gate is close
101—C5 Galaxy Rear gate in the closed position
102—A C5 Galaxy ready to download, the Rear Gate is open and the Cargo Downloading Device deployed
103—C5 Galaxy Rear Gate fully open
104—C5 Galaxy Cargo Downloading Device deployed
105—A C5 Galaxy downloading, the Rear Gate is open and the Cargo Downloading Device deployed, the aircraft is accelerating, nose up; the water is being propelled by the aircraft acceleration, aircraft position and the gravity force.
106—Water being propelled from the aircraft
107—A C5 Galaxy returning to cruse mode, the Rear Gate is closed and the downloaded water keeps going down
108—Propelled water going down
110—A Chinook loaded, the Rear Gate is close
111—Chinook Rear Gate closed
112—A Chinook ready to download, the Rear Gate is open and the Cargo Downloading Device deployed
113—Chinook Rear Gate fully open
114—Cargo Downloading Device deployed
115—A Chinook downloading, the Rear Gate is open and the Cargo Downloading Device deployed, the aircraft is accelerating, nose up; the water is being propelled by the aircraft acceleration, aircraft position and the gravity force.
116—A Chinook returning to cruse mode, the Rear Gate is closed and the downloaded water keeps going down
117—A Bush or Forrest on Fire
118—Fire
119—Smoke
120—A Chinook flying toward the fire with a loaded Pendant Tank 121—A Chinook flying back from the fire with an empty Pendant Tank
122—A truck towing a full tank toward the Pick-Up Area
123—A Pendant Tank full being towed toward the Pick-Up Area
124—Fire Hose
125—The closest Fire Hydrant to a clearance
126—Fire Engine pumping water into a Pendant Tank from a Fire Hydrant
127—Pendant Tank being filled by a Fire Engine Novel Devices The concepts in simple terms are outlined below with reference to the Figures for the development of Transporters and Helicopters fire fighting devices.

The C17 standard specifications will be used to quantify some concepts related to the Water Tanks (tank) and the Downloading Device (chute). The Chinook CH-47 specification rages at the moment from 9,000 liters to 15,000.

The tanks are designed to make the contents stable as a typical solid load; these tanks are the new generation of waveless tanks by using a natural water property "water can't be compressed" which is applied in a novel and simple form; this design teaches away from the classical honeycomb design which adds a significant weight and cost to current waveless tanks.

Waveless Tank Concept

The top profile rises toward the waveless buffer installed at the top, the waveless lid are located well below the water level actually immersed completely in water.

The waveless lid always closes below the water level.

Therefore, underneath the waveless lid there is only water and no air.

Water cannot be compressed, and with no air, the tank is as steady as a solid load.

The hinges of the waveless lid have a penetration at the highest point for venting the airlocks between tanks and to release the pressure that may fluctuate with water volume variations produced by changes in temperatures which may drop with the altitude or decrease if tanks are left full overnight.

The tanks may be coated with a reflective heat resistant paint to minimize irradiated heat absorption.

Modular

The aircrafts carrying capacity is a variable figure and depends on fuel quantity which relies on other parameters unique to the trip such as altitude, distance, speed and load. Thus less fuel may be required leaving the provability to load more water and by having modular tanks it is possible to increase the water capacity for a short trip at low altitude to fight fires and refueling may take place as the tanks are exchanged. Modular tanks will help to deal with aircraft sizes and limitations.

It is feasible to manage 6 tanks of 12.6 Ton tanks, but impractical to load a 75.6 Tons water tank.

The C17 loading ramp maximum capacity is 18.1 Ton.

The current solution is to install large tanks and refill with pumps and hoses. A well-trained crew may exchange 6 tanks and refuel the aircraft in less than 15 minutes which is the shortest time claimed by Airliners to refill.

Linkable

Safety demands that tanks must be properly secured in the cargo area plus the link between tanks need to be solid and vibration proof water seal between tanks. The simplistic top and bottom lock seal shown above may need a secondary mechanical safety lock or one or more heavy duty bolt and thread.

Connectable

The basic function is to form one large tank which can release water uninterrupted. If a large volume of water is released from an aircraft, safety concerns are raised as follows: water is as malleable as a solid element; water needs to reach the fire as compact as possible. This combination of features means that water dropped in large quantities is likely to harm people, property, forest or fauna. Thus, it is necessary to determine the safe amount of water that can be released and establish the best practice for the fire fighting aircrafts.

Control on Demand

Water can be controlled as follows:

The tanks vanes valves are spring loaded at the closed position.

The tanks vanes valves are secured in the closed position with a manual electro-mechanical safety lock until the tanks are ready to be downloaded.

The tanks vanes valves are open by a solenoid and remain open.

The tanks vanes valves can only be closed, locked and unlocked manually.

Each tank has two independent safety locks for each bank of vane valves.

The solenoids are selected by electrical ON/OFF switches; one switch per tank and one switch per the two vanes located at the same level (5 levels per tank) six switches per tanks plus the master which is a pulse switch.

If possible, the water can be released uninterrupted by switching "ON" all the vanes and tanks switches and on cue the master switch sends an electrical pulse and 75.6 Tons of water are released uninterrupted.

If required the water can be restricted by selecting a combination on cue the master switch which sends an electrical pulse and two tanks are released and the next combination is selected and the "next" combination is completed as per above.

The release of water from the tanks can be controlled by a simple control system or by a logic controller with efficient pre-programmed combinations.

Collapsible (Full)

The tanks have a collapsible under carriage which is normally locked at the up position. The tanks is filled up and when required the under carriage lock is released and will collapse cushioned by spring or air struts locking to "the next" tanks then the undercarriage is locked in the down position.

Self Raising (Empty)

Once the tank is empty and ready to be moved for refilling, the under carriage is unlocked, the tank rises unassisted, is locked in the up position and the tank is ready to be refilled and so on.

Water free flow friendly All devices will be designing to allow the water to flow freely which normally follows organic shapes.

The claims defining the invention are as follows:

1. A waveless device for holding liquids comprising linkable, connectable and lockable members, wherein the device comprises a tank or a plurality of tanks comprising a liquid suitable for aerial fire fighting, chemical treatment, fumigation or irrigation, wherein the liquid comprises a top surface within the device, wherein the device comprises a waveless buffer and waveless lids installed at the top of the device, and wherein a plurality of tanks within the device comprises airlocks between the tanks, wherein the device comprises a top profile which rises toward the waveless buffer, wherein the waveless buffer is configured to comprise the top surface of the liquid when the tank is filled with the liquid, wherein the waveless lids are located below the top surface of the liquid and are configured to be immersed completely in the liquid when the tank is filled with the liquid, wherein the waveless lids are configured to close below the top surface of the liquid when the tank is filled with the liquid, thus ensuring absence of air pockets in the liquid; and wherein the waveless lids comprise hinges that comprise a penetration at the highest point of the lids within the device for venting the airlocks between tanks in a plurality of tanks and to release pressure that may fluctuate with liquid volume variations produced by changes in temperatures which may drop with the altitude or decrease if tanks are left full overnight.

2. The device according to claim 1 wherein the tank is completely filled with liquid and there is no void volume in the tank, rendering the tank waveless.

3. The device according to claim 1 wherein the flow of liquid from the tank or plurality of tanks is controlled by louver valves or vanes.

4. The device according to claim 1, further comprising a downloading member configured to discharge liquid from the device.

5. The device according to claim 4, wherein the downloading member comprises a stiffened front end connected to a flexible member.

6. The device according to claim 5 wherein the flexible member is composed of canvas type material.

7. A waveless device according to claim 1, wherein the device comprises a liquid for aerial firefighting and is configured for flow of the liquid from an aircraft, wherein the flow of the liquid is controlled by the opening and closing of electro mechanic devices that control louver vanes or valves, and wherein downloading of the liquid from an aircraft is controlled by conditions selected from the direction of wind, wind velocity, the inertia produced by aircrafts as acceleration, and the gravity produced naturally as the aircraft lifts wherein the aircraft a transporter aircraft with a rear gate.

* * * * *